(12) United States Patent
Wittenberg et al.

(10) Patent No.: US 8,132,986 B2
(45) Date of Patent: Mar. 13, 2012

(54) WATER BALLASTED WAVE ATTENUATOR

(75) Inventors: Daniel Wittenberg, Belcarra (CA);
Lockhart Gordon McCallum,
Richmond (CA); **Robert William
Richard Field**, Delta (CA)

(73) Assignee: **I.M.F.S. International Marine
Floatation Systems Inc.**, Delta (CA)

( * ) Notice: Subject to any disclaimer, the term of this patent is extended or adjusted under 35 U.S.C. 154(b) by 212 days.

(21) Appl. No.: 12/557,362

(22) Filed: Sep. 10, 2009

(65) Prior Publication Data
US 2010/0067987 A1    Mar. 18, 2010

Related U.S. Application Data

(60) Provisional application No. 61/098,100, filed on Sep. 18, 2008.

(51) Int. Cl.
*E02B 3/04* (2006.01)
(52) U.S. Cl. .......................... 405/25; 405/111
(58) Field of Classification Search .............. 405/26, 405/27, 219, 25, 111; 114/263, 266, 267
See application file for complete search history.

(56) References Cited

U.S. PATENT DOCUMENTS

| | | | | |
|---|---|---|---|---|
| 2,858,790 A | * | 11/1958 | Russell, Jr. ................ 114/121 |
| 3,799,093 A | * | 3/1974 | Thomson ................... 114/266 |
| 3,848,419 A | | 11/1974 | Bowley | |
| 3,864,920 A | * | 2/1975 | Tazaki et al. ................ 405/27 |
| 3,889,476 A | | 6/1975 | Gerin | |
| 4,850,742 A | | 7/1989 | Bouchet et al. | |
| 4,887,654 A | * | 12/1989 | Rytand ....................... 114/267 |
| 5,107,785 A | | 4/1992 | Baxter | |
| 5,242,243 A | | 9/1993 | Bachelier | |
| 5,404,825 A | * | 4/1995 | McElwain .................. 114/263 |
| 5,429,452 A | | 7/1995 | Frost | |
| 5,707,172 A | | 1/1998 | Wilcox | |
| 5,775,248 A | * | 7/1998 | Simola ........................ 114/267 |
| 5,827,011 A | | 10/1998 | Kann | |
| 5,911,542 A | * | 6/1999 | Obrock et al. .............. 405/219 |
| 6,022,172 A | * | 2/2000 | Siyaj ........................... 405/110 |
| 6,102,616 A | | 8/2000 | Foote | |
| 6,199,502 B1 | * | 3/2001 | Mattson ...................... 114/266 |
| 6,443,653 B1 | | 9/2002 | Zingale | |
| 6,715,958 B2 | | 4/2004 | Wittenberg et al. | |
| 7,226,245 B2 | | 6/2007 | Kent et al. | |
| 2003/0077122 A1 | * | 4/2003 | Carnahan et al. ........... 405/21 |
| 2004/0018056 A1 | | 1/2004 | Wittenberg et al. | |

FOREIGN PATENT DOCUMENTS
GB        1293521 A      10/1972
* cited by examiner

*Primary Examiner* — Tara Mayo-Pinnock
(74) *Attorney, Agent, or Firm* — Oyen Wiggs Green & Mutala LLP

(57) ABSTRACT

A water ballasted wave attenuator is provided. The water ballasted wave attenuator includes (a) a hollow shell formed of reinforced concrete; (b) a flotation medium in the upper region of the shell (a); (c) a water ballast chamber disposed in the lower region of the interior of the shell; (d) at least one water vent connecting the water ballast chamber with the exterior of the shell; and (e) at least one air vent connecting the water ballast chamber with the exterior of the shell, the at least one air vent including an outlet located higher than the at least one water vent.

8 Claims, 3 Drawing Sheets

WATER BALLASTED WAVE ATTENUATOR

REFERENCE TO RELATED APPLICATION

This application claims Convention priority on U.S. provisional patent application Ser. No. 61/098,100, filed Sep. 18, 2008.

FIELD OF THE INVENTION

This invention relates to a novel water ballasted wave attenuator that can be used to diminish or eliminate the impact of waves on shorelines or objects located in or on water bodies.

BACKGROUND OF THE INVENTION

Wave action generated by wind on large bodies of water has great force and can erode shorelines and cause damage to objects that are located in or adjacent the water bodies. One of the techniques used to diminish or eliminate the force of the wave action on the object and protect the object is to deploy a floating wave attenuator on the wave side of the object. The floating wave attenuator absorbs a percentage of the force of the wave, thereby protecting the object on the lee side of the wave attenuator.

As a general physical rule, the height of the wave is proportional to the force generated by the wave. Furthermore, waves generate forces both above and below the water level. Thus, a conventional floating wave attenuator, if it is capable of handling waves of high elevation, must have a proportional part of its mass deployed below the water line. Conventional floating wave attenuators that are designed to deal with waves of high elevation, and substantial force must accordingly be of very heavy mass and are therefore cumbersome to transport and install. Furthermore, the cost of a wave attenuator designed to deal with waves of high elevation, by having a large mass, is very expensive.

A number of companies manufacture wave attenuators of various designs. For instance, Shoremaster, www.shoremaster.com/marina/alum/atten.html, manufactures and sells aluminum and concrete wave attenuator systems.

Sullivan Flotation Systems, Warwick, N.Y., manufactures a modular wave attenuator with a galvanized structural steel truss frame inside, floated by polyethylene floats with premolded cores, and clad in laminated structural yellow pine beams to create walkways.

Marina Ventures Ltd., Baltimore, Md., manufactures floating wave attenuators constructed of metal flotation material and wood.

Wave Dispersion Technologies, Inc., manufactures modular floating breakwaters, under the trade-mark Whispr Wave, www.whisprwave.com, The breakwaters have been installed at the port of Los Angeles and the port of Long Beach.

Elemental Innovation, Inc., West Caldwell, N.J., manufactures tunable wave attenuators under the trade-mark, "HALO ECO". The attenuators are composed of durable, non-toxic materials.

Wavebraakker LLC, Katy, Tex., manufactures a modular floating wave attenuator system that is held in place by a suitable anchoring system. The system, marketed under the trade-mark, "WAVE BREAK", uses a three-dimensional assembly of special scientifically designed modules. The alternate positioning of the modules in the configuration increases the turbulence of the waters flowing though the "brake" and in turn reduces their force and magnitude.

SUMMARY OF THE INVENTION

A wave attenuator which utilizes water as a ballast below the water line is disclosed. Typically, the water ballasted wave attenuator is constructed of a reinforced concrete shell. The shell is typically constructed in an elongated box-like configuration. Polystyrene flotation is installed in the upper interior of the reinforced concrete shell. Water vents may be located in the lower region of the concrete shell or filler pipes in the upper portion and permit water to enter the lower interior of the concrete shell, below the polystyrene flotation. Once the wave attenuator is deployed in a body of water, water enters the lower interior of the reinforced concrete shell and enables the force of wave action to be fully or partially absorbed.

One aspect of the invention provides a water ballasted wave attenuator comprising: (a) a hollow shell formed of reinforced concrete; (b) a flotation medium disposed in the upper region of the interior of the reinforced concrete shell; (c) an air chamber disposed below the polystyrene flotation medium in the lower region of the interior of the reinforced concrete shell; and, (d) at least one water vent located in the lower region of the interior of the reinforced concrete shell, said vent connecting the interior of the shell with the exterior of the shell.

Another aspect of the invention provides a water ballasted wave attenuator wherein the flotation medium is expanded polystyrene and the structure is unsinkable.

Another aspect of the invention provides a water ballasted wave attenuator including an air vent which enables air in the air chamber below the polystyrene flotation medium to escape to the exterior of the reinforced concrete shell at the top region of the concrete shell.

Another aspect of the invention provides a water ballasted wave attenuator wherein the reinforced concrete shell has an elongated hollow cubical configuration.

Another aspect of the invention provides a water ballasted wave attenuator including connection mechanisms for linking together a plurality of wave attenuators.

Another aspect of the invention includes at least one wave deflector that extends downwardly from the base of the attenuator.

DETAILED DESCRIPTION OF THE INVENTION

Water, when subjected to wave action, follows an elliptical motion. A wave's elliptical motion typically extends to a depth roughly half of the distance between wave crests. Wave attenuators of deeper depths are usually more effective in providing wave attenuation, than shallow wave attenuators. To the extent a wave's energy extends below a floating wave attenuator, a portion of the wave will travel under the structure and partially reform on the other side. Depending on the nature of the wave the important factors in floating water attenuation are the width and the mass of the attenuator.

Because the energy of a wave travels in an elliptical motion, the depth of a floating breakwater or attenuator is very important. If the bottom of the ellipse is greater than the depth of the wave attenuator, a portion of the wave's energy will travel under the wave attenuator and continue with reasonable force. Accordingly, the deeper the wave attenuator, the greater the wave dampening effect of the structure.

Figure 1:
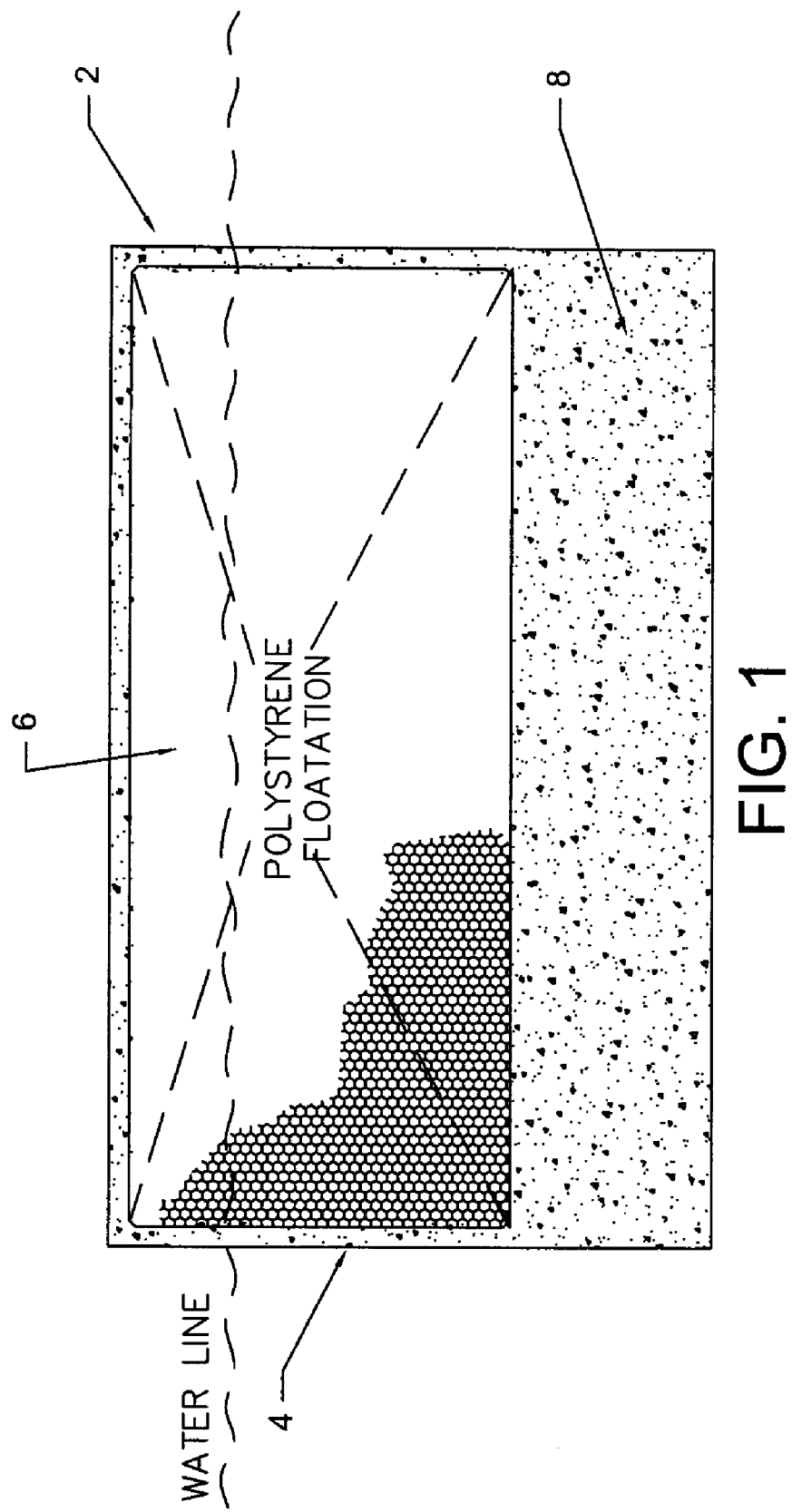
FIG. 1 illustrates a front partial section view of a conventional wave attenuator constructed with concrete ballast. The configuration and location of the ballast concrete varies and may be distributed around the perimeter of the section.

Referring to FIG. 1, which illustrates a front partial section view of a conventional floating wave attenuator, with concrete ballast, the wave attenuator 2 is constructed of a reinforced hollow concrete shell, usually of hollow elongated cubical configuration, with polystyrene flotation 6 installed in the spatial interior of the shell 4. The bottom of the shell to a significant depth is constructed of reinforced concrete thereby providing a concrete ballast 8. If the wave attenuator 2 is designed to handle large waves, then the depth of the concrete ballast is large.

This construction of wave attenuator suffers from the fact that it is expensive to construct, extremely heavy, and therefore difficult to transport and install on site.

Figure 2:
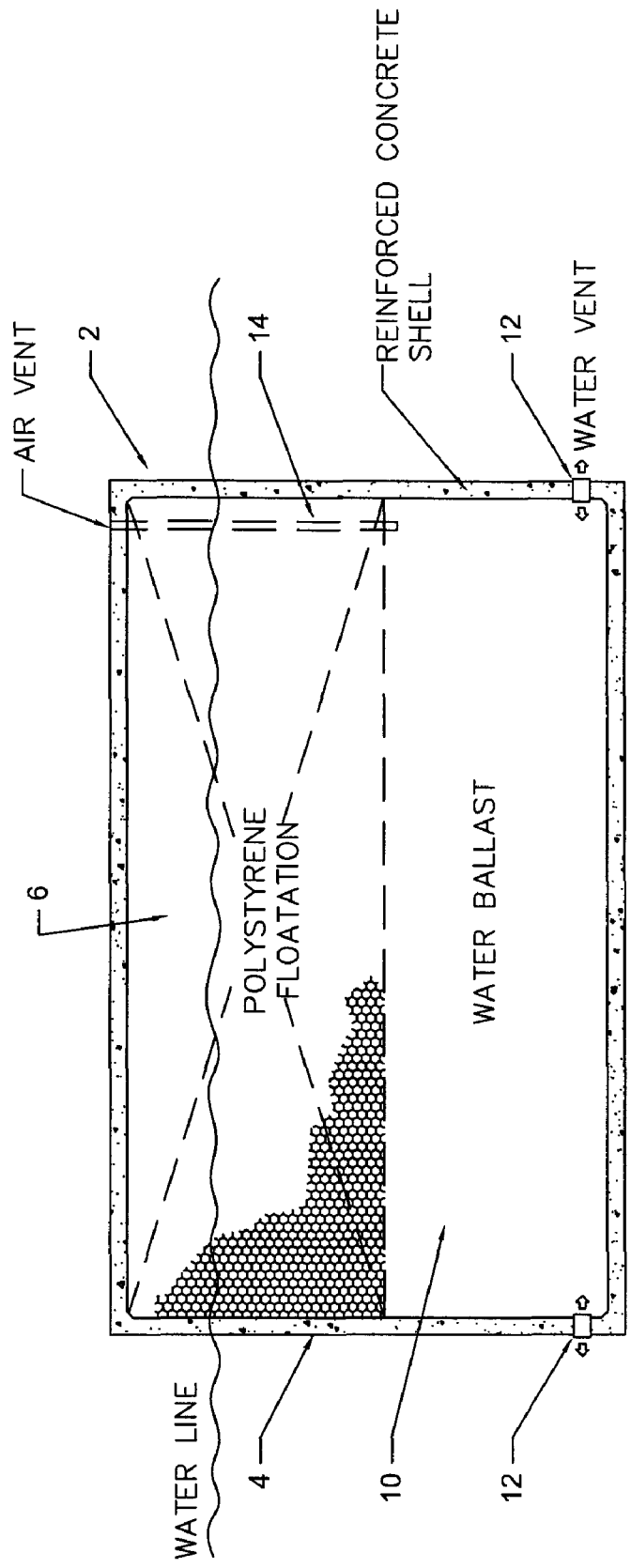
FIG. 2 illustrates a front section view of a wave attenuator with water ballast, according to the invention.

We have invented a novel design of a water ballasted wave attenuator. FIG. 2 illustrates a front section view of the water ballasted wave attenuator. As seen in FIG. 2, the wave attenuator 2 is constructed to have a hollow cubical or elongated cubical shell 4 manufactured of reinforced concrete. The upper portion of the interior of the reinforced concrete shell 4 is hollow and contains an appropriate amount of polystyrene flotation 6. Located below the polystyrene flotation 6 is a water ballast chamber 10. Water vents 12 permit water to pass in to and out of the water ballast chamber 10, when the attenuator 2 is installed in a body of water. An air vent 14 is located in an upper region of the concrete shell 4 and enables air from the water ballast chamber 10 to exit through the top of the shell 4 as water flows into the water ballast chamber 10 via the pair of water vents 12.

Figure 3:
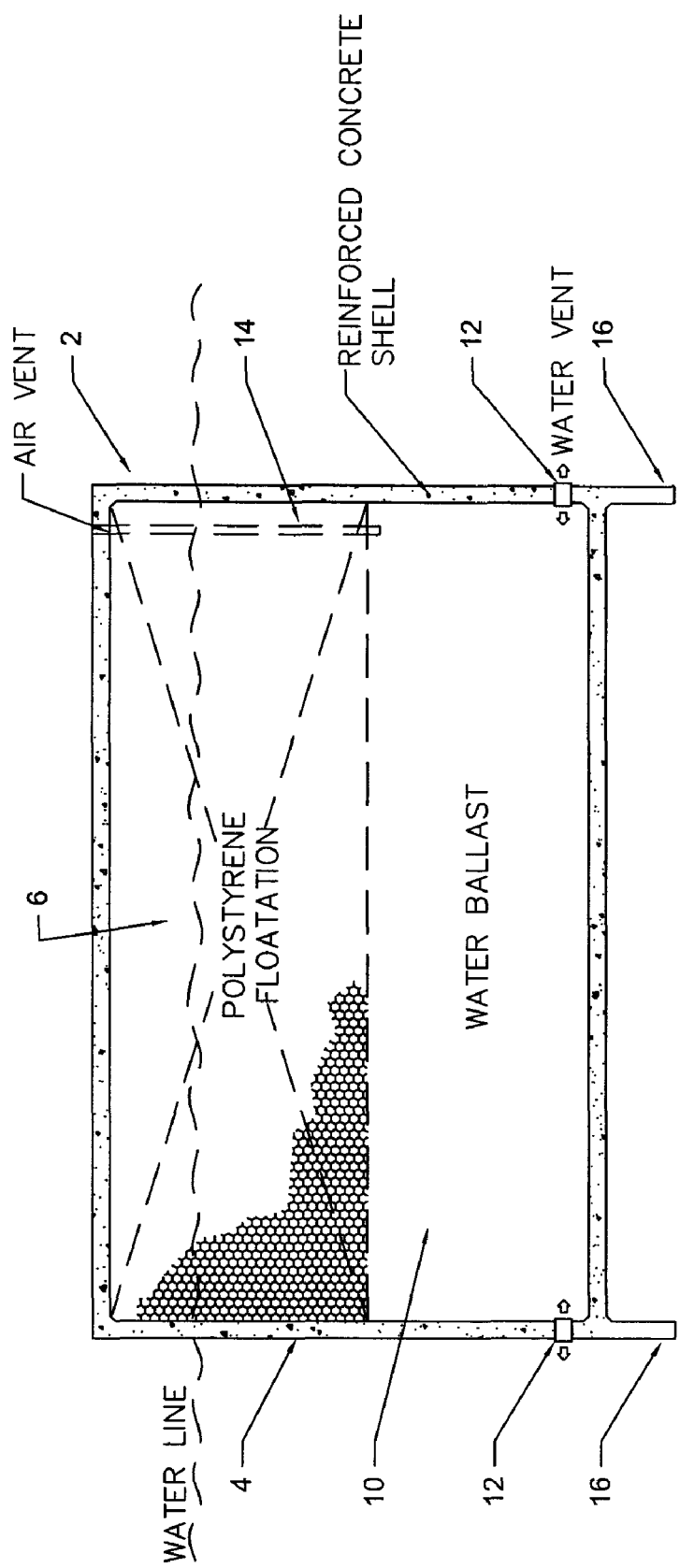
FIG. 3 illustrates a front section view of an alternative embodiment of a wave attenuator with water ballast.

FIG. 3 illustrates a front section view of an alternative embodiment of a wave attenuator with water ballast. The overall design is similar to that shown for FIG. 2. However, the embodiment shown in FIG. 3 includes a pair of wave deflectors 16 that extend downwardly from the two bottom edges of the wave attenuator. These wave deflectors 16 can be of any desired downwardly extending length in order to attenuate wave action. It will be understood that in certain situations, the wave attenuator may have only one downwardly extending wave deflector 16.

A major advantage of the water ballasted wave attenuator, according to the invention, is that it is considerably less expensive to manufacture, compared to a conventional concrete ballasted wave attenuator, and since no concrete ballast is included, the water ballasted wave attenuator, when manufactured on land and transported to a water site, is much lighter in weight than a corresponding concrete ballasted wave attenuator. The same is true for the alternative embodiment illustrated in FIG. 3.

The table below illustrates a comparison between a conventional concrete ballasted wave attenuator of a given size and a water ballasted wave attenuator according to the invention, of the same size. All figures are per linear foot.

| Specification and Dimensions | Concrete Ballasted Wave Attenuator | Water Ballasted Wave Attenuator |
| --- | --- | --- |
| Displacement 288 cubic feet (12 feet depth × 24 feet in width) per linear foot | 18,432 pounds per linear foot | 18,432 pounds |
| Dry weight | 18,432 pounds (9.2 tons) | 5,700 pounds (2.8 tons) |
| Wet weight | 18,432 pounds | 18,432 pounds |
| Concrete quantity | 3.5 cubic metres | 1 cubic metre |
| Styrofoam quantity | 216 cubic feet | 95 cubic feet |

As can be seen in the above table, the dry weight of the water ballasted wave attenuator is approximately one third the dry weight of the concrete ballasted wave attenuator, yet it provides equal water displacement. Likewise, the amount of concrete required to construct the water ballasted wave attenuator is less than one third the quantity of concrete required for the concrete ballasted wave attenuator. Furthermore, since the overall dry weight of the water ballasted wave attenuator is about one third of the dry weight of the concrete ballasted wave attenuator, roughly 43% less Styrofoam is required to provide sufficient water buoyancy for the water ballasted wave attenuator. These differences are dramatic and significant. The water ballasted wave attenuator is less expensive to construct, since it uses less concrete. It weighs roughly one third of the weight of the concrete ballasted wave attenuator, and thus makes it much easier to transport and install at the water site. Notwithstanding these differences, the water ballasted wave attenuator provides the same water displacement as the concrete ballasted wave attenuator. The water ballasted wave attenuator, because it is much lighter in weight, enables the concrete shell of the water ballasted wave attenuator to be built to much greater depth than the depth of a concrete ballasted wave attenuator for approximately the same cost. Since depth of the floating wave attenuator is important in diminishing or eliminating the force of waves of high elevation, the ability of the water ballasted wave attenuator to be built to great depth, for relatively inexpensive cost and weight, makes the water ballasted wave attenuator extremely versatile and effective in handling high elevation waves, with strong driving forces.

While not shown in FIG. 2, it is understood that the water ballasted wave attenuator 2 can include connector mechanisms that enable a plurality of wave attenuators to be linked together. The same is true for the alternative embodiment illustrated in FIG. 3.

While a number of exemplary aspects and embodiments have been discussed above, those of skill in the art will recognize certain modifications, permutations, additions and sub-combinations thereof. It is therefore intended that the following appended claims and claims hereafter introduced are interpreted to include all such modifications, permutations, additions and sub-combinations as are within their true spirit and scope.

What is claimed is:

1. A water ballasted wave attenuator comprising:
   (a) a hollow shell formed of reinforced concrete;
   (b) a flotation medium disposed in an upper region of an interior of the shell;
   (c) a water ballast chamber disposed in a lower region of the interior of the shell;
   (d) at least one water vent connecting the water ballast chamber with the exterior of the shell; and
   (e) at least one air vent connecting the water ballast chamber with the exterior of the shell, the at least one air vent comprising an outlet located higher than the at least one water vent;

whereby when the water ballasted wave attenuator is deployed, air from the water ballast chamber can escape through the at least one air vent to the exterior of the shell to allow the water ballast chamber to fill with water.

2. A water ballasted wave attenuator as claimed in claim 1 wherein the flotation medium is foamed polystyrene.

3. A water ballasted wave attenuator as claimed in claim 1 wherein the reinforced concrete shell has an elongated hollow cubical configuration.

4. A water ballasted wave attenuator as claimed in claim 1, including connection mechanisms for linking together a plurality of wave attenuators.

5. A water ballasted wave attenuator as claimed in claim 1 including at least one wave deflector extending downwardly from the base of the attenuator.

6. A water ballasted wave attenuator as claimed in claim 1 wherein the at least one air vent is located at least as high as a highest point of the water ballast chamber whereby when the water ballasted wave attenuator is deployed substantially all of the air from the water ballast chamber can escape through the at least one air vent to the exterior of the shell to allow substantially all of the water ballast chamber to fill with water.

7. A water ballasted wave attenuator as claimed in claim 6 wherein the outlet of the at least one air vent is located, when the water ballasted wave attenuator is deployed, above the water line.

8. A water ballasted wave attenuator as claimed in claim 7 wherein the outlet of the at least one air vent is located at a top region of the shell.

* * * * *